United States Patent [19]
Harvey et al.

[11] Patent Number: 5,829,199
[45] Date of Patent: Nov. 3, 1998

[54] WINDOW OPERATOR

[75] Inventors: John Harvey; Andrew George Fuge; Jon Leonard Fifield, all of Wellington, New Zealand

[73] Assignee: Interlock Industries Limited, New Zealand

[21] Appl. No.: 676,266

[22] PCT Filed: Jan. 19, 1995

[86] PCT No.: PCT/NZ95/00003

§ 371 Date: Jul. 3, 1996

§ 102(e) Date: Jul. 3, 1996

[87] PCT Pub. No.: WO95/20091

PCT Pub. Date: Jul. 27, 1995

[30] Foreign Application Priority Data

Jan. 21, 1994 [NZ] New Zealand .......................... 250740
Jun. 21, 1994 [NZ] New Zealand .......................... 260803

[51] Int. Cl.⁶ .................................................. E05F 11/00
[52] U.S. Cl. ............................................................ 49/325
[58] Field of Search ................................ 49/325; 52/108

[56] References Cited

U.S. PATENT DOCUMENTS

| | | | |
|---|---|---|---|
| 3,717,247 | 2/1973 | Moore | 52/108 X |
| 4,481,735 | 11/1984 | Jentoft et al. | 49/325 |
| 4,521,993 | 6/1985 | Techeny et al. | 49/325 |
| 5,271,182 | 12/1993 | Greisner et al. | 49/325 |

FOREIGN PATENT DOCUMENTS

| | | | |
|---|---|---|---|
| 133448 | 8/1902 | Germany | 49/325 |
| 49409 | 9/1994 | WIPO | 49/325 |

*Primary Examiner*—Jerry Redman
*Attorney, Agent, or Firm*—Blakely Sokoloff Taylor & Zafman

[57] ABSTRACT

A mechanism for angularly moving a closure element to and from open and closed positions. The mechanism includes a housing which incorporates a guide in which is slidingly located an elongate multi-link connector. One end of the connector is extendible from the housing and is able to be coupled to the closure element by a coupling. A handle mounted with the cover of the housing can be rotated to move the connector relative to the guide. The connector is formed from a plurality of links maintained in an interfitting relationship by an elongate flexible joining element extending therethrough. The connection includes a plurality of drive dogs for engagement with the tooth gear coupled to the handle so that drive from the handle can be imparted to the connector.

24 Claims, 11 Drawing Sheets

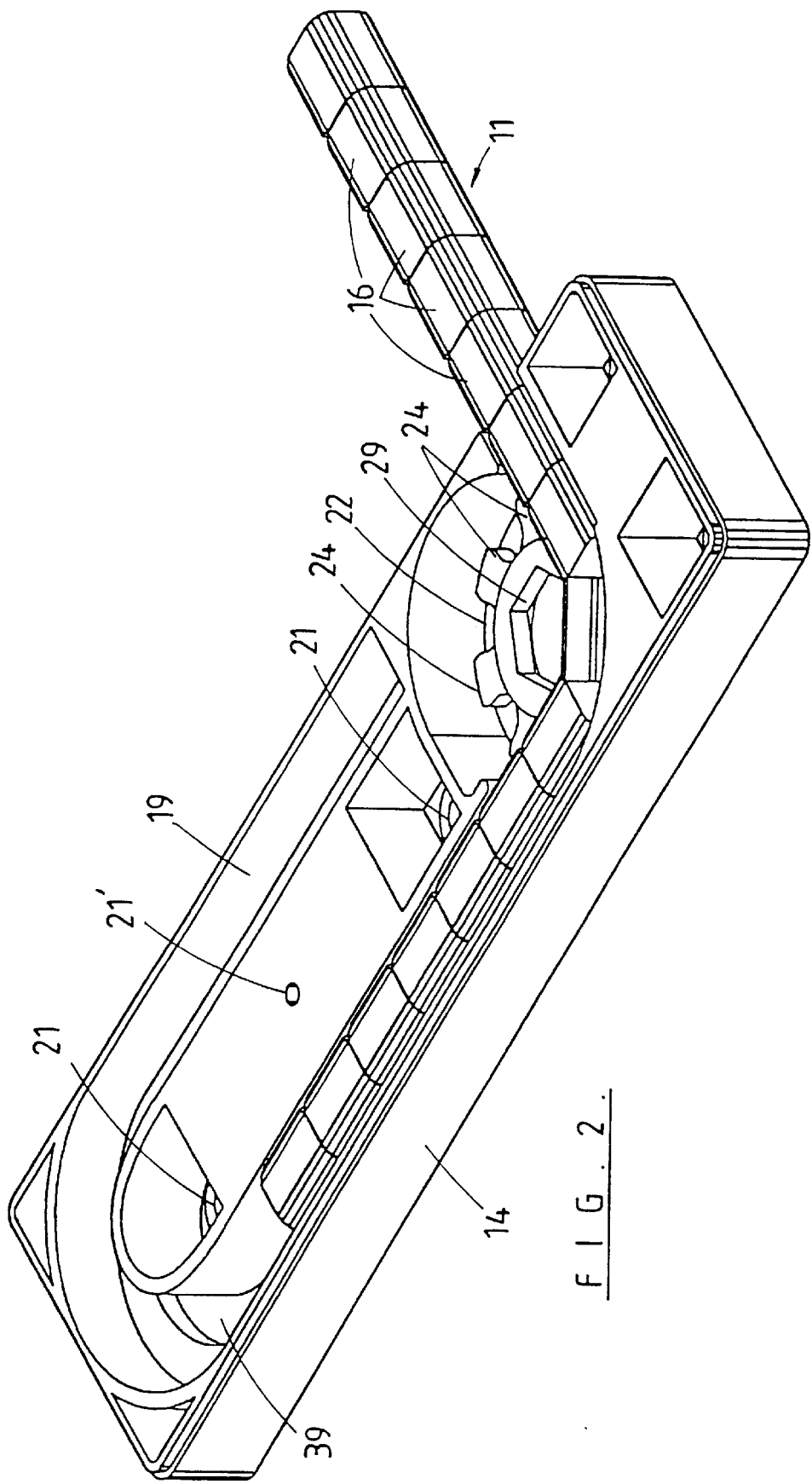

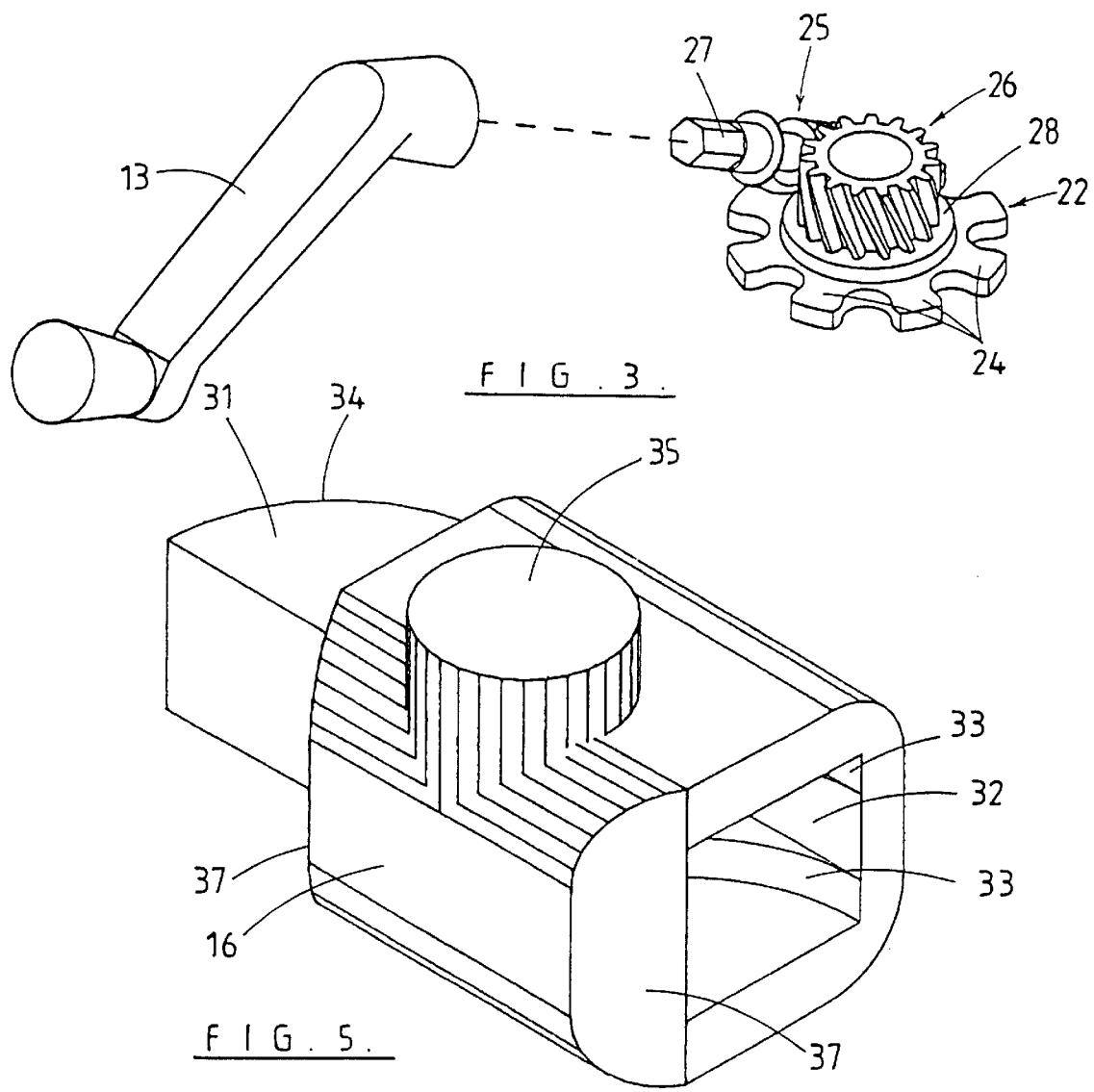

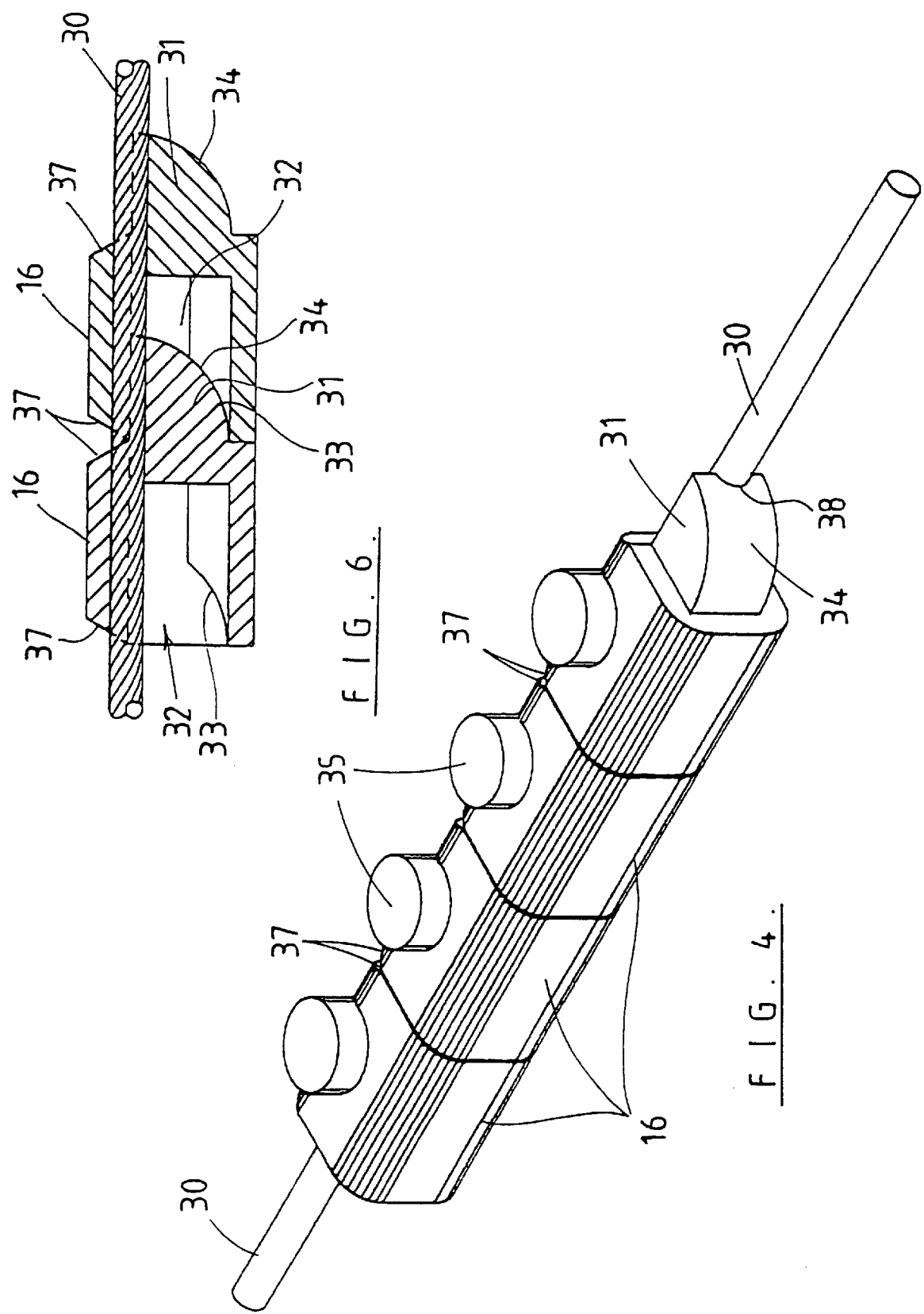

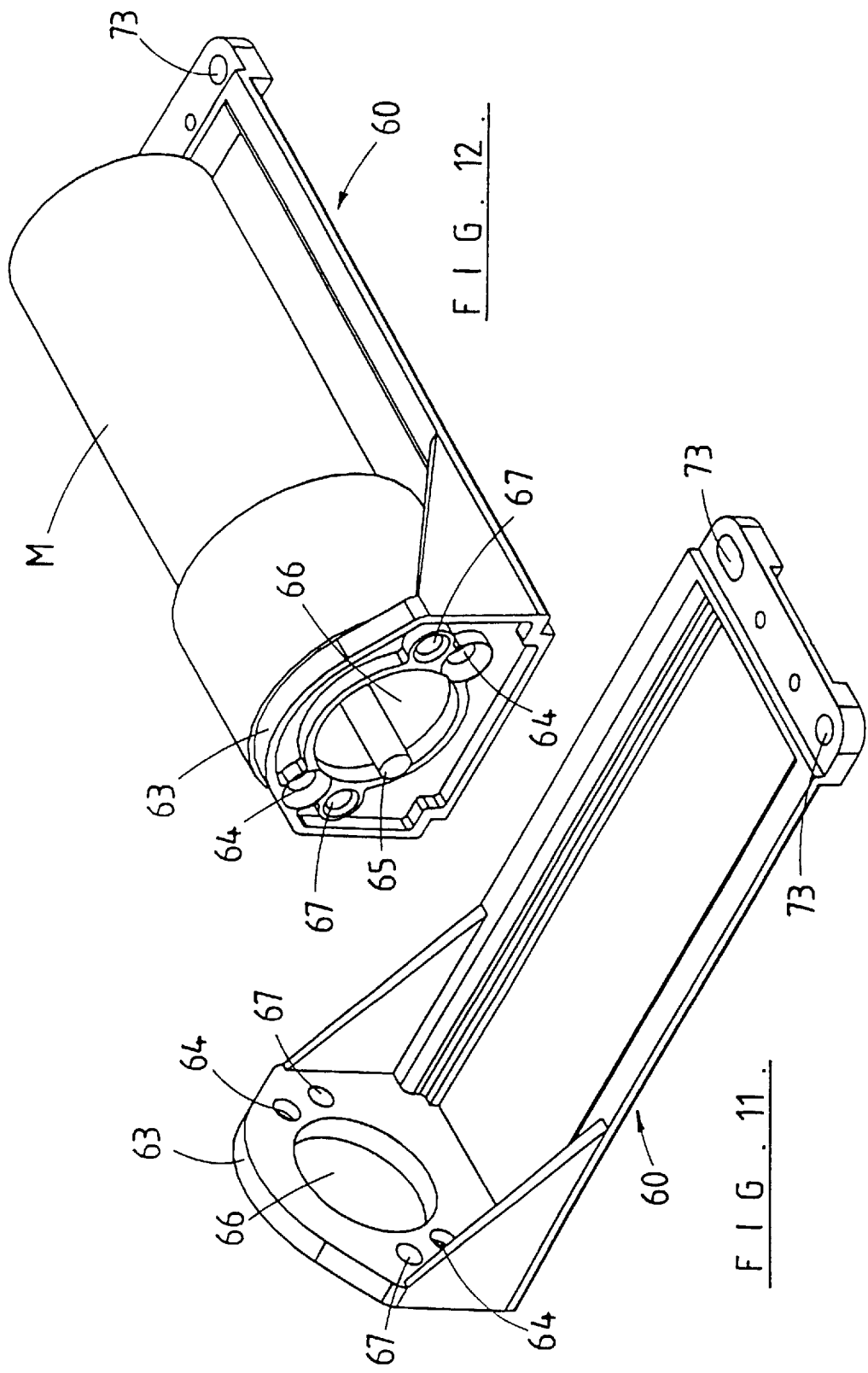

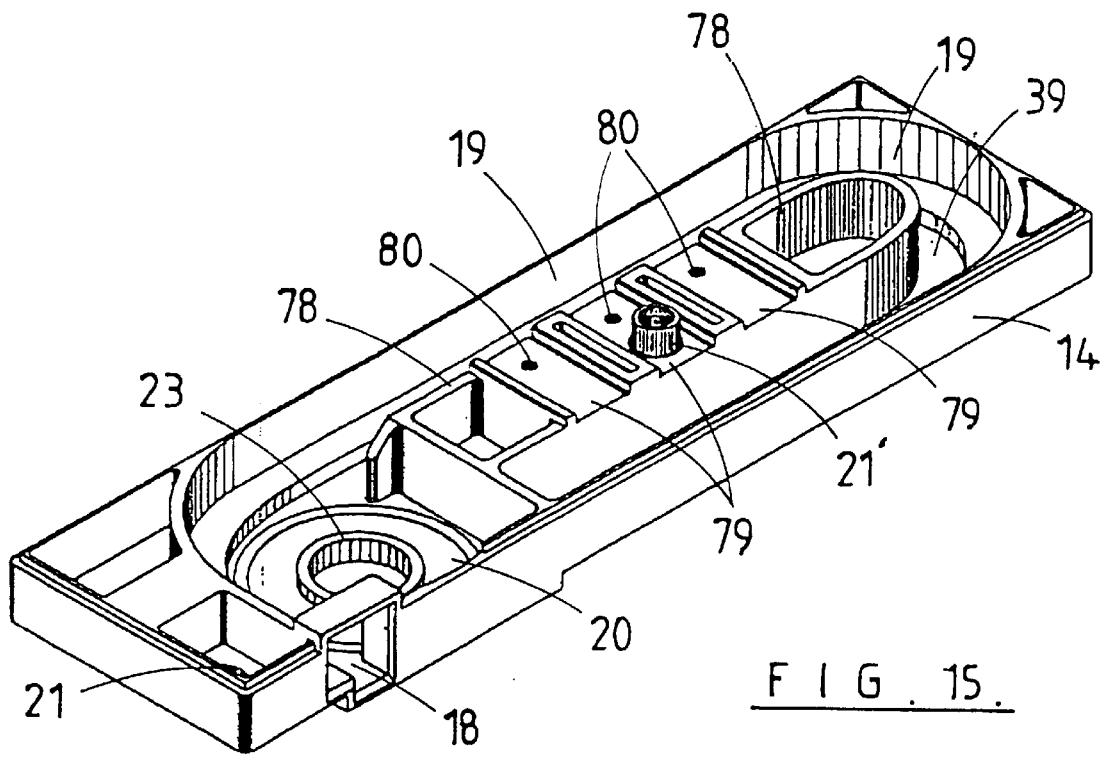
FIG. 15.
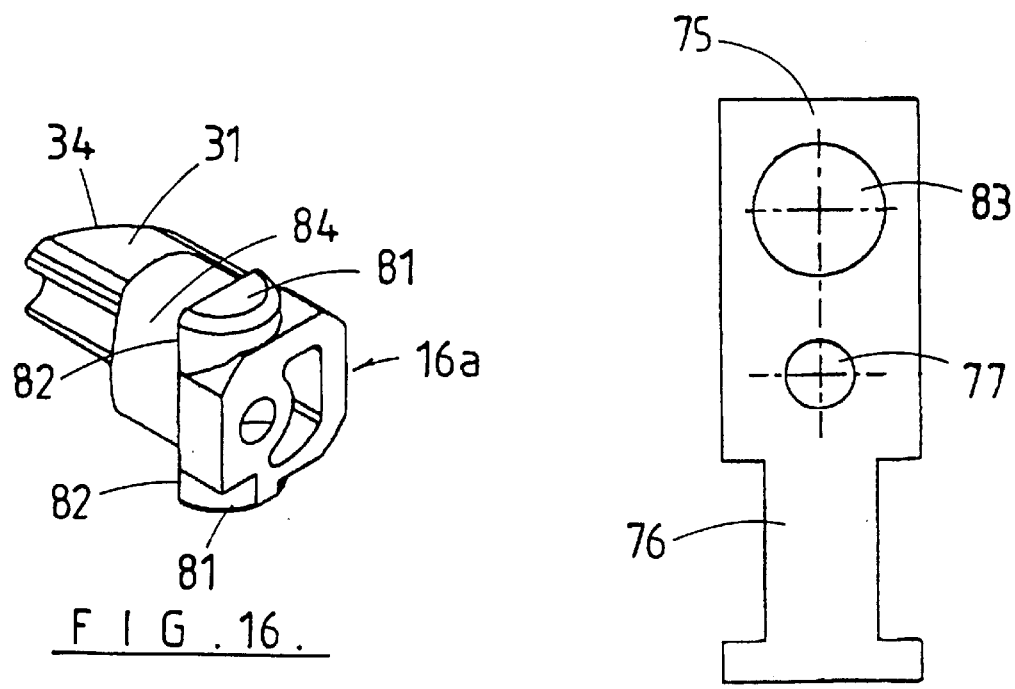
FIG. 16.
FIG. 14.

WINDOW OPERATOR

BACKGROUND OF THE INVENTION

FIELD OF THE INVENTION

The present invention relates to a mechanism for angularly moving a panel or closure element. More particularly the mechanism is intended to perform the function of a window operator for opening and closing a window sash.

SUMMARY OF THE INVENTION

Broadly the invention consists of a mechanism for angularly moving a panel or closure element the mechanism comprising a housing which incorporates a guide in which is slidingly located an elongate multi-link connector one end of which is extendable from the housing and is adapted for coupling to the panel or closure, there being drive means whereby the connector can be moved relative to the guide, said connector being formed from a plurality of links maintained in an inter-engaging relationship by an elongate flexible joining element, the connector including means for engagement with the drive means such that drive from the drive means can be imparted to the connector.

In the preferred embodiment of the invention the links are formed from a plastics material.

According to a second broad aspect of the invention there is provided a mechanism for angularly moving a panel or closure element the mechanism comprising a housing which incorporates a guide in which is slidingly located an elongate multi-link connector one end of which is extendable from the housing and is adapted for coupling to the panel or closure, there being drive means whereby the connector can be moved relative to the guide, the housing being formed by a base portion and a cover incorporating at least part of said drive means, the base portion being formed substantially as a single unit from a plastics material and incorporating said guide, there being drive transfer means associated with said base portion such that drive from that part of the drive means associated with cover is imparted to the multi-link connector.

According to yet a further broad aspect of the invention there is provided a mechanism for angularly moving a panel or closure element the mechanism comprising a housing part of which is formed from a plastics material and which defines a guide in which is slidingly located an elongate multi-link connector said connector being adapted for coupling to the panel or closure, there being drive means whereby the connector can be moved relative to the guide, said connector being formed from a plurality of links maintained in an inter-engaging relationship by an elongate flexible joining element.

According to yet a further broad aspect of the invention there is provided a mechanism for angularly moving a panel or closure element, the mechanism comprising a substantially elongate housing within which is slidingly located a multi-link connector, one end of which is extendable from the housing and is adapted for coupling to the panel or closure, there being drive means whereby the connector can be moved, said drive means including an electric motor mounted with said housing to extend beyond one end thereof, a drive shaft of the motor being coupled to a gear arrangement within the housing to impart drive from the motor to said connector.

BRIEF DESCRIPTION OF THE DRAWINGS

FIG. 2 is a similar perspective view but with the cover removed, FIG. 3 is a detailed view of the operator handle and gear mechanism, FIG. 4 is a perspective view of part of the elongate connector of the operator, FIG. 5 is a perspective view of one of the links of the connector, FIG. 6 is a cross-section view through part of the connector, FIG. 11 is a perspective view of a mounting for a drive motor, FIG. 12 is a further perspective view of the mounting of FIG. 11 but with a motor mounted therewith, FIG. 14 is a perspective view of a more detailed representation of the base of the window operator, FIG. 15 is a plan view of an end stop plate for the base of FIG. 14, and FIG. 16 is a perspective view of an end link of the elongate connector.

DESCRIPTION OF THE PREFERRED EMBODIMENTS

Figure 1:
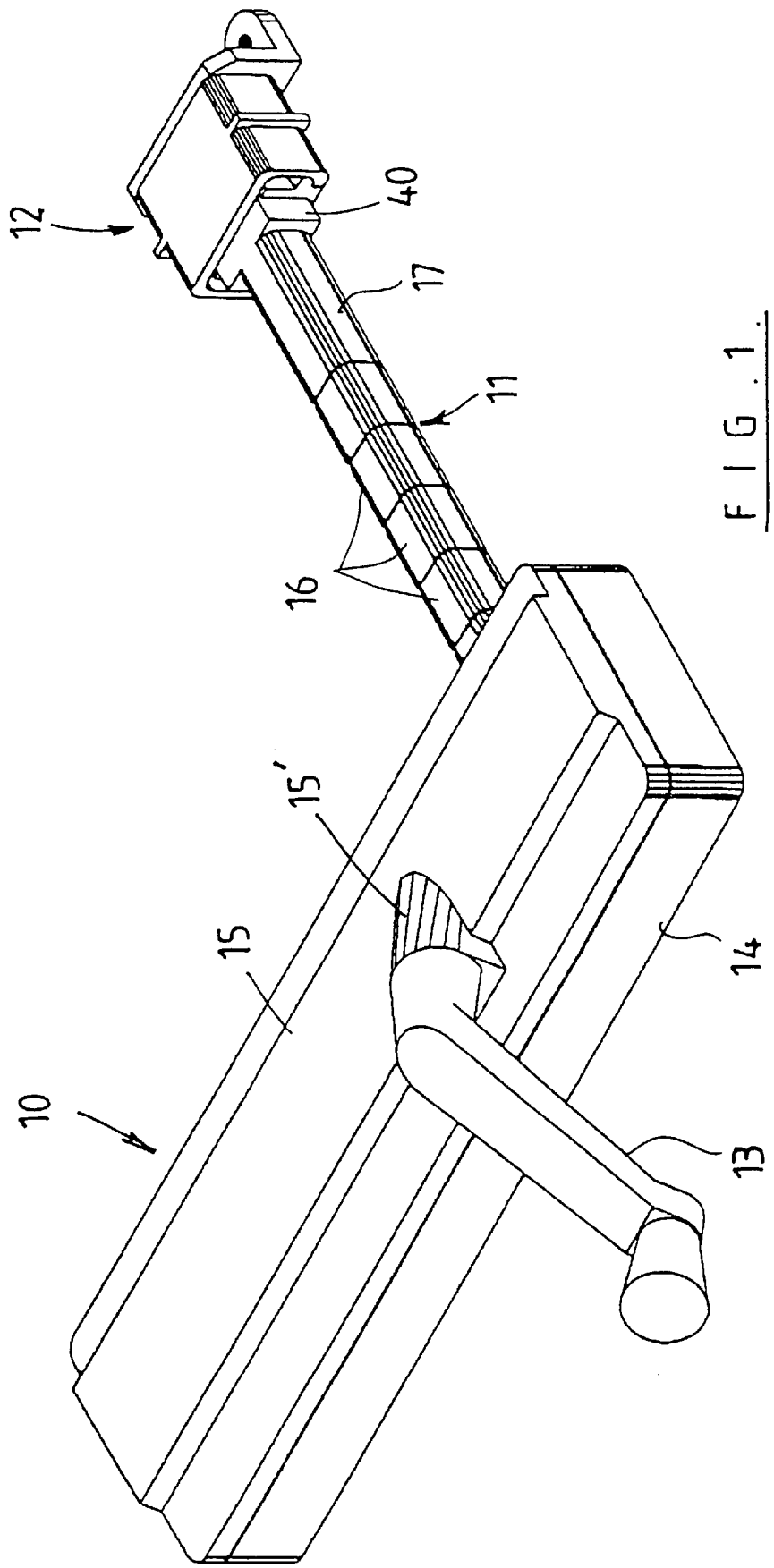
FIG. 1 is a perspective view of the mechanism in a preferred form intended to perform the function of a window operator.

In the drawings and the description which follows the mechanism will be particularly described as a window operator for controlling the opening and closing of a window such as, for example, a skylight window.

The operator comprises a housing 10 which is generally mounted to the frame of the window. Extending therefrom is an elongate multi-link connector 11 which is coupled via a sash bracket 12 to the sash of the window. A rotatable handle 13 mounted with the cover of the housing can be rotated to effect extension and retraction of the connector so as to open and close the window sash, ie angularly move the sash relative to the housing 10.

As shown in FIG. 1 the housing 10 includes a base 14 and a cover 15. The handle 13 is rotatably journalled with a turret 15a formed as part of the cover 15. The connector 11 is formed of a plurality of links 16 and projects from an opening 18 in a side wall of the base.

According to the preferred form of the invention base 14 is formed as one piece. It is preferably moulded from a plastics material such as acetyl. Formed within base 14 is a guide 19 and a sprocket recess 20. Openings 21 are formed in the base 14 such that the base can be mounted by mechanical fasteners to, for example, the frame of the window. In one form the fasteners engage through openings into the window frame. Also a further fastener can fit through another opening 21' in base 14. This enables the fasteners through openings 21 to be removed to remove the cover while the fastener through opening 21' maintains the base 14 in place on the frame.

The connector 11 is slideably mounted in guide 19 (see FIG. 2). Movement is imparted to the connector by a sprocket 22 which is rotatably engaged on a spigot 23 (integrally formed in base 14) located in the floor of sprocket recess 20. Teeth 24 of sprocket 22 engage with connector 11 (as will hereinafter be described) to impart drive thereto from handle 13.

Drive to sprocket 22 is imparted from handle 13 via a worm 25 and a gear 26. Worm 25 has an end portion 27 of hexagonal cross section which fits into a similarly shaped bore (not shown) in handle 13. As illustrated worm 25 meshes with the teeth of gear 26. This gear 26 includes a flange 28 having a multi-sided (eg hexagonal) spigot (not shown) which engages in a similarly shaped and dimensioned opening 29 in gear 22. Thus upon handle 13 being rotated worm 25 rotates so as to thereby turn gear 26 which due to the interaction of the multi-sided spigot from flange 28 in opening 29 causes the sprocket 22 to rotate within sprocket recess 20.

Cover 15 provides a bore 52 in which worm 25 is rotatably located. A retaining bush 53 screws into the tapped end of bore 52. A roll pin 54 extends through a bore 55 in cover 15 to engage with retaining bush 53 and thereby prevent it from inadvertently loosening or becoming unscrewed. An opening (not shown) is formed in the side of the part of turret 15a of cover 15 which defines bore 52 and this enables the teeth of worm 25 to engage with helical gear 26.

The helix angles selected for the worm 25 and gear 26 are selected so that the weight of a sash acting back through connector 11 will not cause sprocket 22 to rotate and thereby allow the sash to close.

Multi-link connector 11 comprises a plurality of links 16 which are engaged end to end on a cable 30. In a preferred form of the invention cable 30 is a wire formed by a flexible (eg fibre) core with a multi-strand wire outer. The cable thus exhibits not only the required tensile characteristics but is also of a flexible nature so that the connector can conform with and move along the guide 19. In an alternative embodiment the cable can be also made from plastics material.

Each of the separate links 16 is moulded from a plastics material such as, for example, glass filled nylon. Each links 16 comprises a tongue 31 and a cavity 32 (see FIG. 5). Cavity 32 has a pair of curved ramps 33, the radius of curvature thereof corresponding to the curved surface 34 of tongue 31. Each link 16 includes a drive dog 35 which projects from one side surface of the link.

Connector 11 is made up of links 16 joined end to end with the tongue 31 of each link fitting into a cavity 32 of the adjacent link. The multi-strand cable 30 is engaged through the links (as illustrated in FIGS. 4, 6 and 7) with each end of the cable 30 having a collar 36 crimped thereon (within end link 17 and behind the last 16' of the links) this having a flush end surface to enable crimping to be carried out so as to prevent the links from moving axially apart.

Each link 16 has a chamferred face 37 at each end. Accordingly as connector 11 traverses the curved portions of the guide 19 (e.g. as shown in FIG. 7) relative movement between the links 16 can take place. This relative movement is controlled by the interaction of the curved surface 34 of tongue 31 working on ramps 33. The chamferred faces 37 provide sufficient clearance between the adjacent edges of adjacent links (see FIG. 7).

Cable 30 is located within a groove 38 which extends through each of links 16. This groove 38 is located between ramps 33 and is offset to the central longitudinal axis of the link. This enables uniform tension in the connector to be maintained at different positions of storage of the connector in the guide 19. In the preferred form of the invention the groove 38 where it interfaces with an edge such as, for example, chamferred face 37 is provided with a small radius so that as the connector-sector moves about a curved portion of the guide 19 the cable 30 does not bite into a radial edge of the groove 38.

Figure 7:
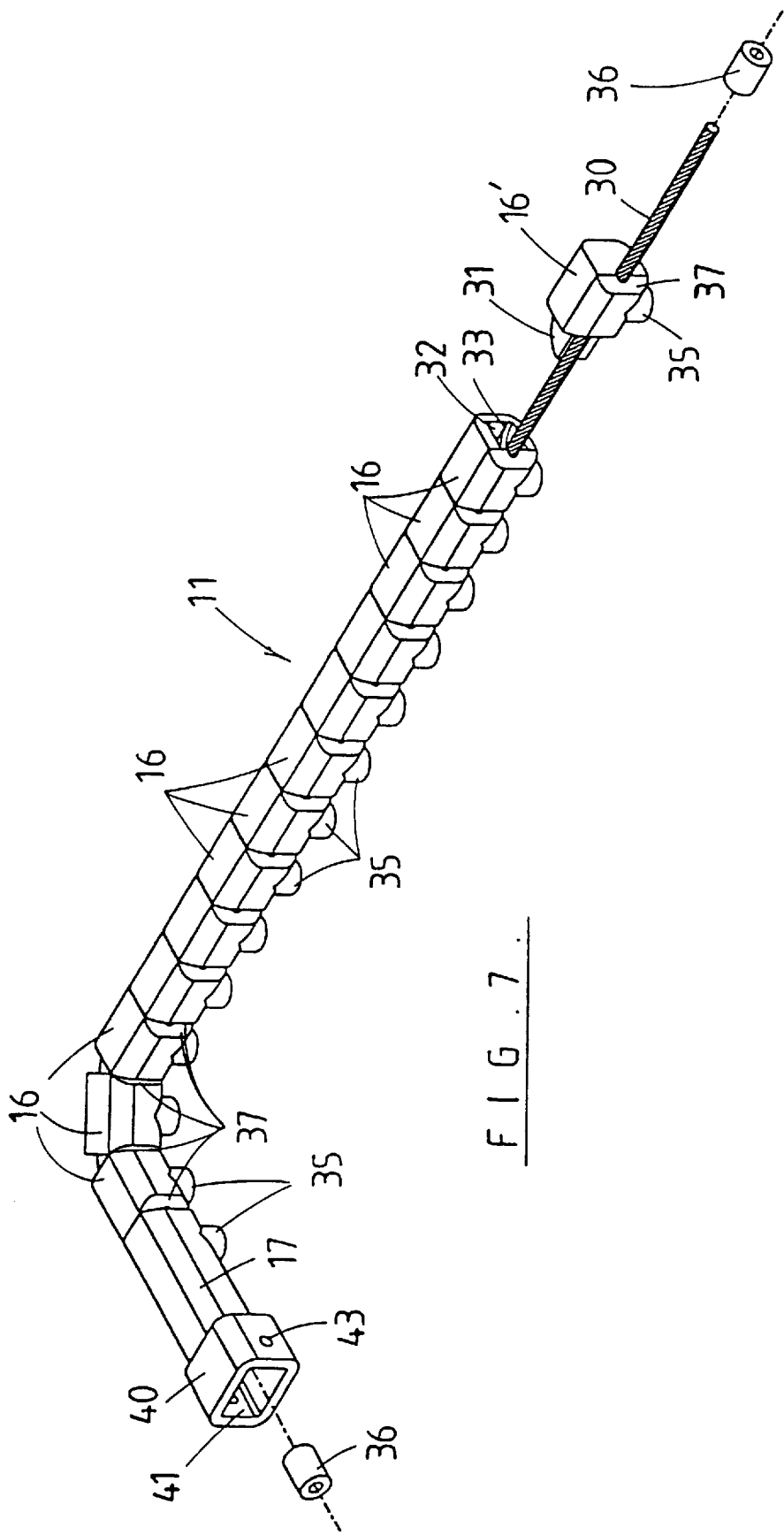
FIG. 7 is a perspective view (partly exploded) of the connector.
Figure 8:
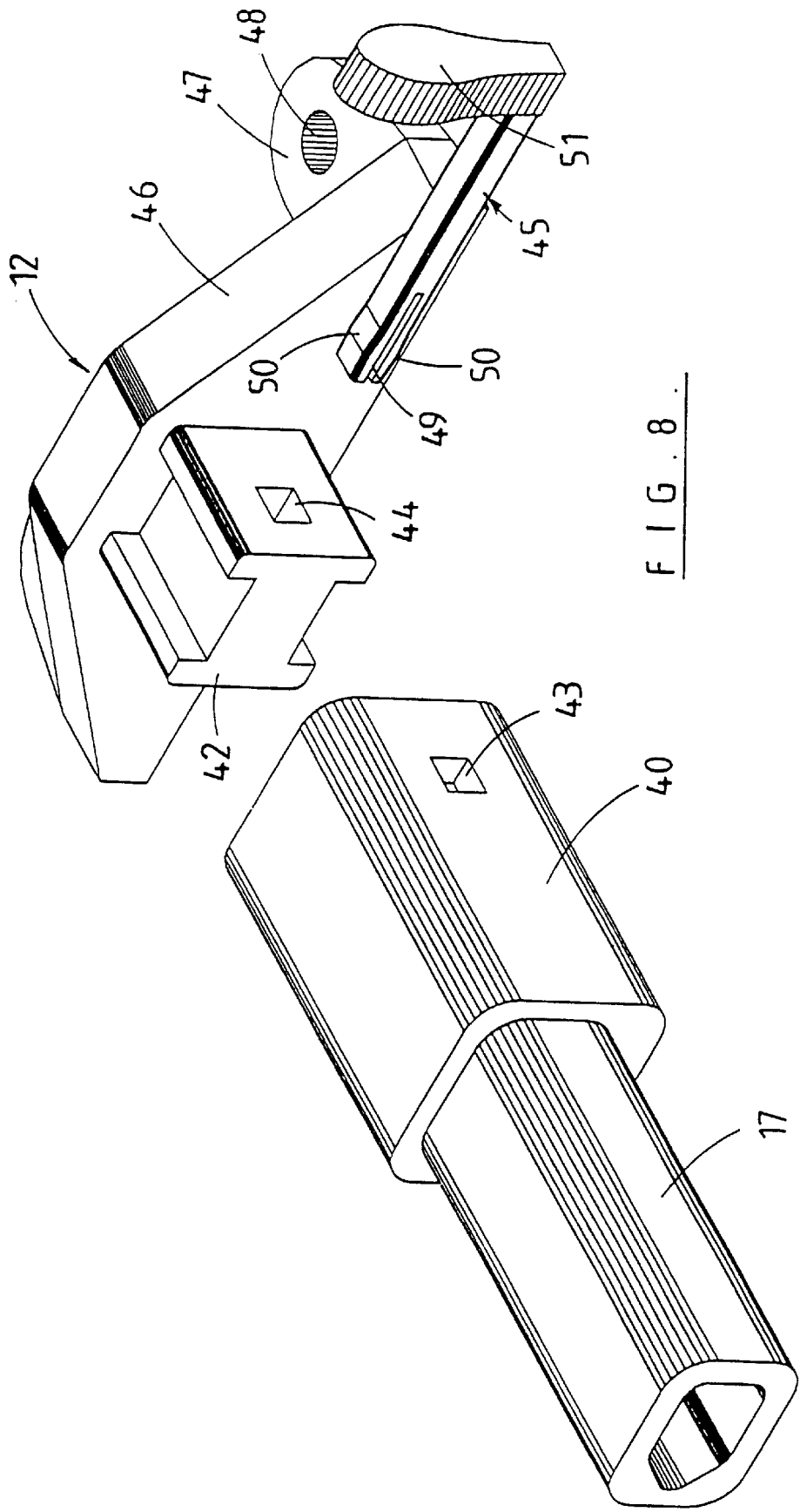
FIG. 8 is a perspective exploded view of the sash bracket attachable to the end of the connector and mountable on a window sash.

As can be best seen in FIG. 7, the chamferred faces 37 of adjacent links 16 meet at an apex which effectively forms a fulcrum. Thus as the links move relative to one another during the connector curving about a curved portion of the guide 19 a mechanical pivot action between the links is set up. This is contrary to the normal action of, say, a cable chain which relies simply on flexure of the cable.

Furthermore with the inter-fitting of the tongue 31 of one link 16 in recess 32 of an adjacent link and the inter-engagement of the curved surface 34 of tongue 31 with ramps 33 the links are able to withstand compressive forces. Additionally the inter-fitting of the tongue in the recess provides resistance to lateral bending. Consequently during operation of the operator relative movement between the links of up to 90° can be achieved. However, in the horizontal plane (see FIG. 7) a limited amount of movement in the vertical plane is also permitted due to lateral clearance between the tongues in the recesses) so as to provide limited angular displacement and thus limited lateral bending of the connector outside the guide 19 as the window sash opens and is closes.

Figure 9:
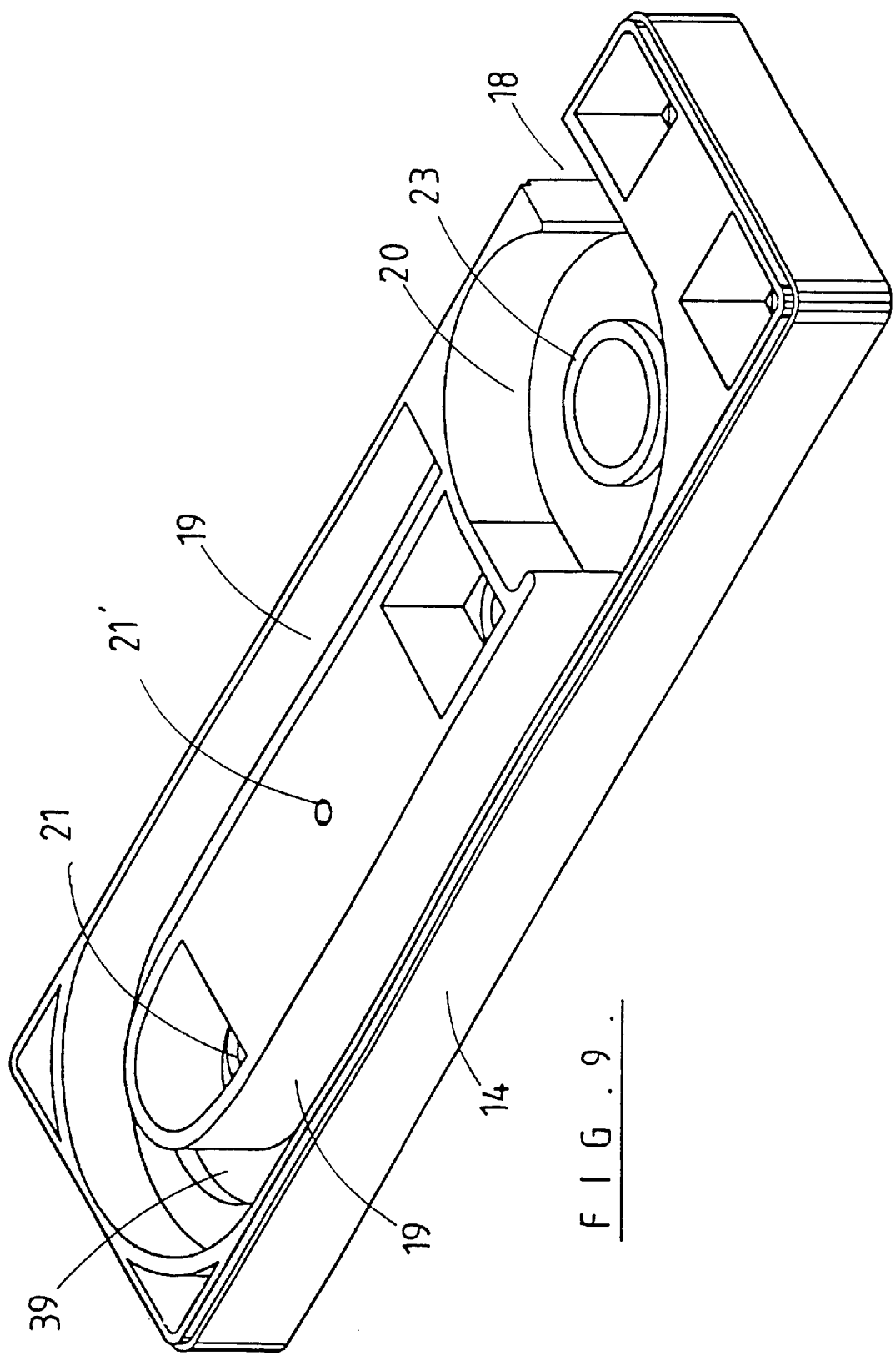
FIG. 9 is a perspective view of the base portion of the housing.
Figure 10:
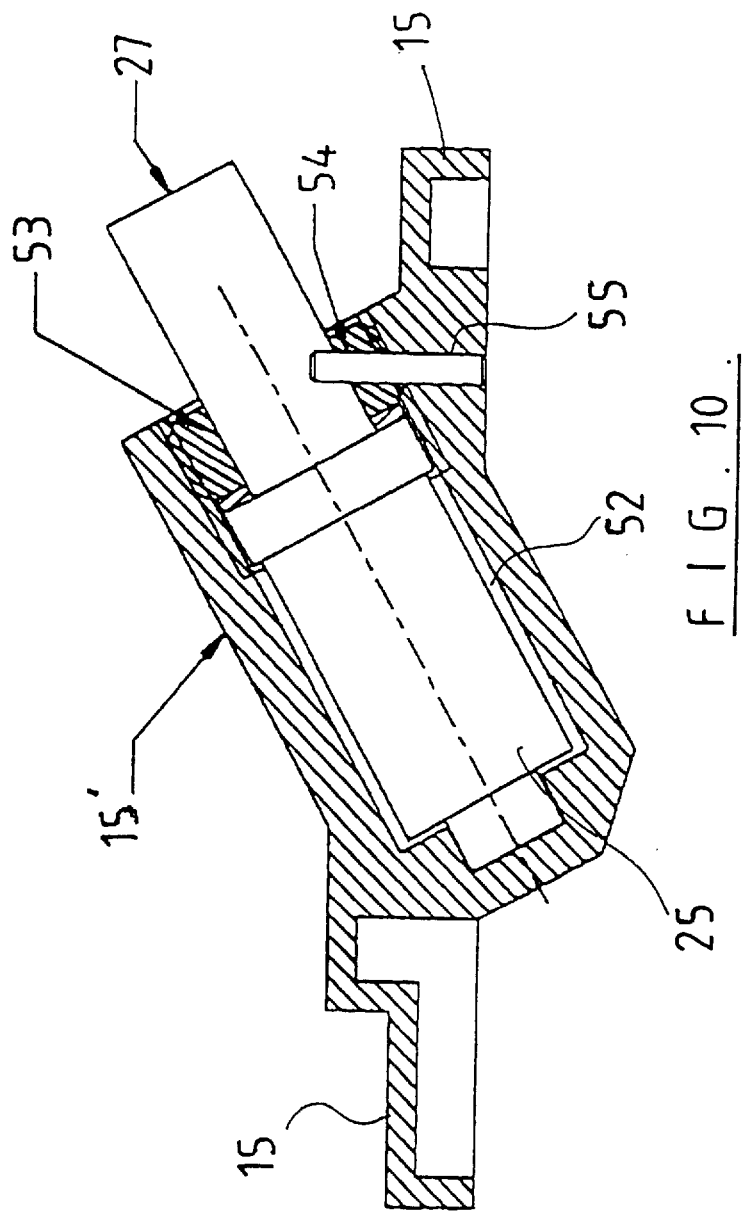
FIG. 10 is a cross-section through the turret of the cover of the housing.

As can be seen in FIGS. 2 and 9 the guide 19 is formed integrally in base 14 and thus includes no separate elements. It is, however, provided with a stepped floor such that a groove 39 is formed therein. Slidingly engaged in groove 39 are the drive dogs 35 of links 16.

The teeth 24 of gear 22 are so configured and gear 22 is so positioned that teeth 24 engage between the drive dogs 35 of the links 16 which are located in recess 20. Accordingly rotation of gear 22 results in a corresponding sliding movement of connector 11 in groove 19, this movement being either inward or outward depending on the direction of rotation of gear 22.

As illustrated end link 17 of connector 11 couples the connector to the sash bracket 12. This end link 17 is of different configuration to the other links as it is longer in length and has an end portion 40 which is of angular cross section. In one form of the invention as illustrated in FIG. 1, this end portion 40 lockingly fits within an opening 41 formed in sash bracket 12.

Due to the cross-sectional dimensions of end portion 40 being greater than opening 18 the end portion 40 also acts as a stop to prevent the connector being drawn too far back into housing 10.

However, according to a more preferred embodiment of the invention end 40 defines an angular bore 41 into which a projection 42 of sash bracket 12 is engageable. Opposing side walls of end portion 40 each incorporate an opening 43. These openings 43 are aligned and when projection 42 is inserted into bore 41 openings 43 also align with a bore 44 which extends through projection 42.

The sash bracket 12 is attached to end link 17 by a pin 45 inserted through aligned openings 43 and bore 44. The pin could, for example, simply be a well known type of coupling of substantially U shape with one leg thereof inserted through openings 43 and bore 44.

In the illustrated form of the invention projection 42 projects from a flange 46 which has a pair of lugs 47 with openings 48 projecting from an opposite side thereof. By means of mechanical fasteners engaged through openings 48 the sash bracket can be attached to the sash of a window.

Also according to the illustrated form of the invention pin 45 has a bifurcated end portion 49 with opposite edge surfaces of the bifurcated end incorporating ridges 50. Thus when pin 45 is forced through the aligned openings 43 and bore 44 the bifurcated end 49 compresses but is restored to its original configuration after passing through the second of the openings 43. The pin is thus retained in position. However, to achieve quick release of the end link 17 from sash bracket 12 a pulling force can be applied to gripping portion 51 of pin 45 to thereby cause the bifurcated end to compress and enable the pin to be retracted enabling projection 42 to release from end 40.

To prevent the elongate connector from being extended to a point where it moves completely out of guide 19 one of the links 16 (preferably the link which is at the end of the connector opposite to end link 17) is provided with a projection which comes into engagement with a stop formed, say, with the cover 15. Thus rotation of handle 13 can take place so that connector 11 extends out from the housing to a point where the projection on the end link comes into engagement with the stop.

End link 17 by being longer than each of links 16 results in a direct connection between sprocket 22 and the sash when the window is closed. Thus in negative pressure situations the sash is less likely to be sucked open due to stretching of the connector.

According to a preferred form of the invention the stop can be adjustable in position such that the amount by which the connector can extend from the housing 10 can be adjustedly limited.

The stop can be a plate 75 (FIG. 15) having a waisted extension 76 projecting from one end. An opening 77 is formed in plate 75.

The island 78 which forms one side of the guide 19 can have a plurality of lateral grooved portions 79 into which plate 75 can fit. Once the plate 75 is in place in one of grooved portions 79 it can be fastened by a fastener extending through opening 77 and into aperture 80 in the floor of the grooved portion 79. The waisted extension thus projects across the top of guide 19.

The inner end link 16a of the connector 11 can take the form shown in FIG. 16. Thus the link 16a includes opposing outwardly projecting spigots 81 which present a forwardly facing surface 82. The connector 11 can thus be extended out of the housing until the uppermost surface 82 comes into contact with the edge of waisted extension 76 of stop plate 75. The limit of movement of connector 11 can thus be adjusted by selecting an appropriate one of grooved portions 79.

Stop plate 75 also includes an opening 83 which engages over boss 84 surrounding opening 21' when the plate is in grooved portion 79 in which opening 21' is located.

The distance between the ends of spigots 81 is greater than the height of opening 18. The width of the opening 18 is, however, greater. Thus end link 16a is inserted through opening 18 with the axis of the spigots 81 parallel to the length of base 14 whereupon it is rotated through 90° so as to assume its correct orientation. To assist this rotational movement the body of link 16a includes a curved surface 84.

One feature of the present invention is that the connector can be formed, as illustrated, so that it does not have the appearance of a chain which is traditionally used with window operators. As can be seen from FIG. 1 the portion of the connector 11 which extends from housing 10 has a generally uniform appearance which is more aesthetically pleasing than a multi-link chain.

Furthermore by virtue of the links being able to be moulded from a plastics material the connector is more corrosion resistant than conventional metal chains. While corrosion of the cable 30 is a possibility any corrosion would not be visually apparent due to the cable being located within the inter-engaging links 16.

Where the loadings are not high, however, the cable could be formed from a plastics material optionally fibre reinforced. In situations where the cable can be of a plastics material a virtually corrosion resistant operator can be provided by forming the gear elements of the drive means from diecast construction and using diecast materials or plastics for the handle and/or cover.

A further feature of the present invention is that the one piece construction of the base 14 from a plastics material and the use of suitable colourants therein can result in an aesthetically pleasing appearance for the housing 10. This is achieved by the cover 15 and base 14 having a uniform appearance. Furthermore the integral construction of the base 14 enables the guide 19 to be constructed without the need for any inserts or the like of a wear resistant low friction material. This obviates the need for the more complex constructions which have hitherto been used with known window operators.

In a modified form of the invention the operator is motorised. To this end an electric motor M is mounted by a mounting bracket 60 to housing 10. As illustrated the mounting 60 when attached to the housing 10 extends longitudinally from one end of the housing.

In this form of the invention the cover 15 for the manual operator as previously described is replaced by a cover 61. The cover includes a turret 62 from which extends a stub shaft (not shown) With motor M coupled to the stub shaft drive can, via a geared arrangement of the type previously described, be imparted to the multi-link connector 11.

Mounting 60 includes a forward flange 63 which has a pair of openings 64 through which threaded fasteners can engage into aligned openings in the end face of motor M. Flange 63 includes a central opening 66 through which the drive shaft 65 of the motor M projects (see FIG. 12).

The end of cover 61 includes a pair of pins, spigots or the like (not shown) which engage into openings 67 when flange 63 is brought into engagement with the end of housing 10. The inter-engagement of the pins and openings 67 ensure that the shaft 65 of the motor M is correctly aligned with the stub shaft in turret 62. These pins also prevent flange 63 from tending to rotate and thereby enable the motor M to impart torque to the stub shaft.

A coupling 68 couples shaft 65 with the stub shaft in turret 62. This can be achieved by shaft 65 having a pair of diametrically opposed flats which engage in a correspondingly shaped end of the tubular coupling 68. The other end of the coupling 68 can be provided with a bore of hexagonal cross section which engages with a correspondingly shaped stub shaft of turret 62, ie a stub shaft similar to stub 27 as shown in FIG. 3 for the manually operated version of the operator.

Provision can be provided with mounting 60 for terminal blocks 69 whereby cable 70 from a controller (not shown) can be electrically coupled. Wires running from the terminal block 69 connect with the motor M. In accordance with conventional practice a wire 71 can couple through a screen inter-lock 72 which is in turn coupled with fly screen S mounted with window frame F.

Mounting 60 also includes a pair of openings 73 via which fasteners can engage into the frame F so as to further stabilise the mounting 60 relative to the housing 10.

A cover (not shown) can be provided so as to extend over the mounting 60 and motor M and at least over cover 61 to an extent whereby turret 62 is hidden beneath the cover. Alternatively the cover can extend for the total length of housing 10.

Figure 13:
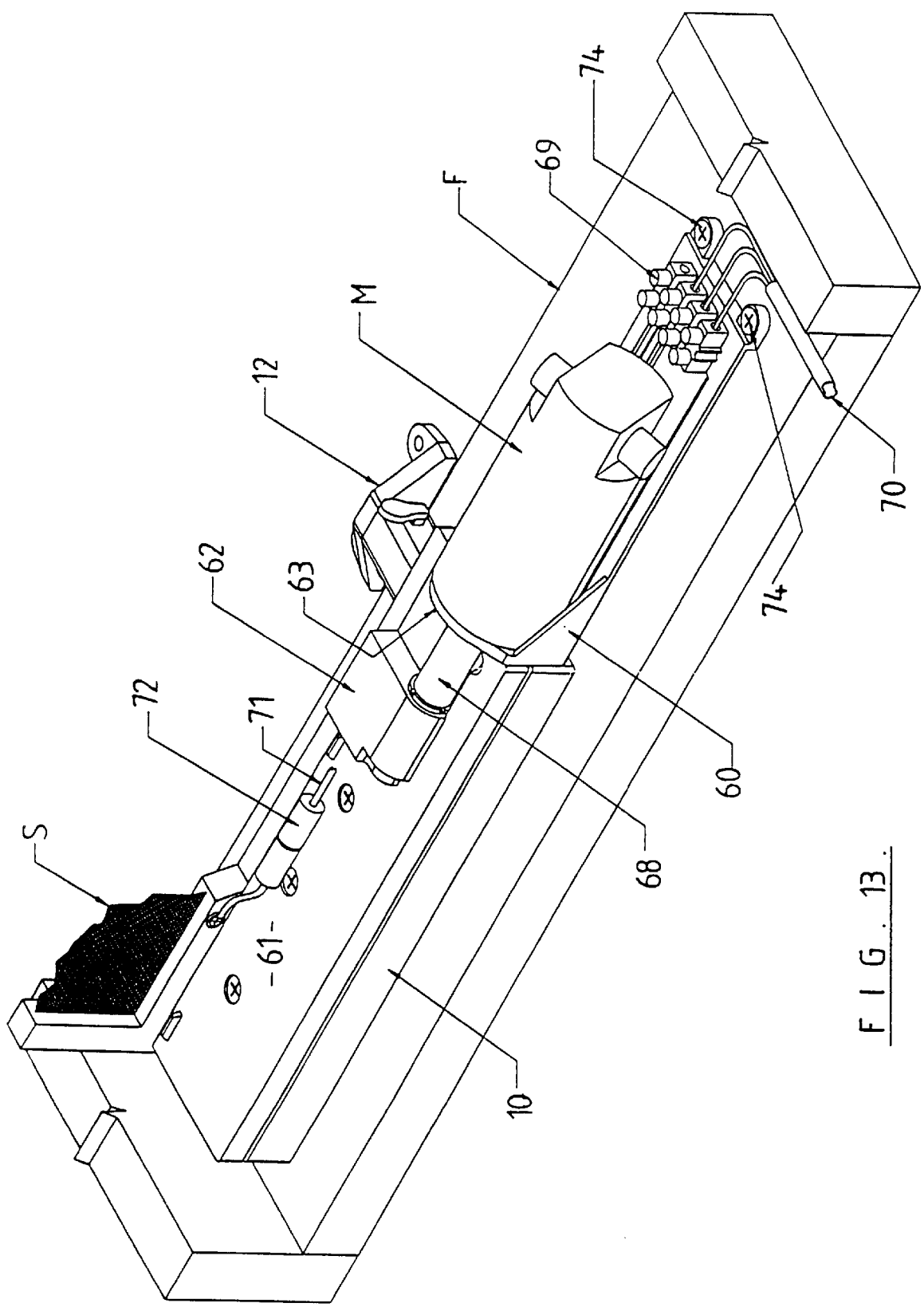
FIG. 13 is a perspective view of a motorised version of the window operator mounted in a window frame.

As a consequence of mounting the motor so as to extend longitudinally from the end of the elongate housing 10 the motorised version of the operator can assume a "slim line" appearance in contrast to known motorised operators which have tended to be of a bulky and aesthetically unpleasing appearance. As shown in FIG. 13 the entire operator can be located within the area of the frame member. This is in direct contrast to known motorised operators which tend to project beyond the edge of the frame and thereby not only be of unpleasant appearance but also provide a projection which can be knocked or can snag with, say, the clothing of a person passing by the window.

Conversion of a manually operated version of the operator into a motorised version is a relatively straight forward operation necessitating only the replacement of cover 15 with new cover 61 and the coupling of pre-assembled motor M, mounting 60 and coupling 68 to the operator followed by fixing of the mounting using the fasteners 74 passing through openings 73. The inter-engagement of the pins or spigots projecting from the end of cover 61 into openings 67 of flange 63 ensures that there is correct alignment between the drive shaft (via coupling 68) to the stub shaft in turret 62.

What is claimed is:

1. A mechanism for angularly moving a closure element to and from open and closed positions, the mechanism comprising a housing which incorporates a guide, in which is slidingly engaged an elongate multi-link connector having one end of which is extendable from the housing and is adapted for coupling to said closure element, there being a drive means whereby the connector can be moved relative to the guide, said connector being formed from a plurality of interfitting links maintained in an interfitting relationship by an elongated flexible joining element, the connector including means for engagement with said drive means such that drive from said drive means can be imparted to the connector.

2. The mechanism according to claim 1 wherein the links are formed from a plastics material adjacent links being in said interfitting relationship by one of the adjacent links having a tongue which is engaged in a cavity in the other of the adjacent links, each link further including a drive element for engagement with said drive means.

3. The mechanism according to claim 2 wherein the housing includes a base portion and a cover, said base portion being formed substantially as a single unit from a plastics material.

4. The mechanism according to claim 2 wherein the joining element is a cable formed by a flexible core with an outer multi-strand wire.

5. The mechanism according to claim 2 wherein the cavity includes at least one curved ramp and the tongue includes a curved surface which engages with and is slideably moveable over the ramp in the cavity in which the tongue is located.

6. The mechanism according to claim 5 further including a stop engageable with one of the links of the connector to prevent the connector from moving completely out of the housing.

7. The mechanism according to claim 6 wherein the stop is adjustable in position such that the amount by which the connector can extend from the housing can be adjustably limited.

8. The mechanism according to claim 7 wherein the stop is formed by a first projection which extends laterally from the guide and is engageable by a second projection from the connector which upon engagement with the first projection limits further movement of the connector.

9. The mechanism according to claim 5 wherein the link at a distal end of the connector is adapted to connect to a bracket via a coupling which can be selectively uncoupled.

10. The mechanism according to claim 9 wherein an end link includes a hollow portion into which a projection of the bracket can engage, said hollow portion and projection including openings which are alignable and through which a pin can be removably inserted.

11. The mechanism according to claim 9 or 10 wherein the end link is of sufficient length that a projection thereof engages with the drive means when the connector is fully retracted.

12. The mechanism according to claim 2 wherein the joining element engages through the interfitting links, each end of the joining element having a stop element mounted therewith to restrict the links from moving axially apart.

13. The mechanism according to claim 12 wherein each link further includes a chamfered edge adjacent each of the cavity and tongue, the chamfered edges of adjacent links being located adjacent one another to provide a clearance between the links such that the connector can curve in one plane.

14. The mechanism according to claim 1 wherein the drive means includes a sprocket rotatably mounted in a recess in a base, the recess being located adjacent said guide such that teeth of the sprocket can engage between drive elements of adjacent links, there being a handle rotatably mounted with a cover and coupled via transfer means to the sprocket.

15. The mechanism according to claim 14 wherein the recess is located adjacent an opening through which the connector extends.

16. A mechanism for angularly moving a closure element the mechanism comprising a housing which incorporates a guide, in which is slidingly engaged an elongate multi-link connector having one end of which is extendible from the housing and is adapted for coupling to said closure element, there being a drive means such that the connector can be moved relative to the guide, said connector being formed from a plurality of interfitting links maintained in the interfitting relationship by an elongate flexible joining element, the connector including means for engaging said drive means such that said drive means can impart movement to the connector, said drive means including an electric motor mounted with said housing to extend beyond one end thereof, a drive shaft of the motor being coupled to a drive transfer means within the housing to transfer drive from the motor to said connector.

17. The mechanism according to claim 11 wherein the motor is mounted to the housing by a mounting bracket which includes a flange engageable with an end of the housing, locating means locating the flange with the housing to provide correct alignment of the shaft of the motor to an input shaft of the drive means.

18. A mechanism for angularly moving a closure element to and from open and closed positions, the mechanism comprising a housing which incorporates a guide, in which is slidingly engaged an elongate multi-link connector having one end of which is extendable from the housing and is adapted for coupling to said closure element, there being a drive means such that the connector can be moved relative to the guide, said connector including a plurality of links located end to end and interfitting by a tongue of each link engaging within a cavity in a next adjacent link, there being a flexible joining element extending longitudinally through the plurality of links to maintain said links in said interfitting relationship, at least one of each adjacent link having a clearance such that the connector can curve in one plane, each link having a drive element projecting therefrom in a direction substantially normal to said one plane, the drive elements being engageable with said drive means for drive to be imparted to the connector.

19. The mechanism as claimed in claim 18 wherein the cavity has an engagement surface with which the tongue engaged therein is slidingly engageable to restrict movement between the links transverse to the flexible joining element when the connector is caused to curve in said one plane.

20. The mechanism as claimed in claim 19 wherein the tongue has a curved surface which is slidingly engageable with said engagement surface of the cavity.

21. The mechanism as claimed in claim 18 wherein the flexible joining element is off set laterally to a centrally disposed longitudinal axis through the connector, said drive elements being off set to the same side of the flexible joining element.

22. The mechanism as claimed in claim 18 wherein the flexible joining element extends through said cavity and at least part of the tongue of each of the links.

23. The mechanism as claimed in claim 20 wherein each link has a clearance, the clearance being formed by a chamfered edge adjacent each of the cavity and tongue, the chamfered edges of adjacent links being located adjacent one another to provide the clearance between the links such that the connector can curve in one plane.

24. The mechanism as claimed in claim 18 wherein the links are formed from a plastics material and the joining element is a multi-strand cable.

* * * * *

UNITED STATES PATENT AND TRADEMARK OFFICE
CERTIFICATE OF CORRECTION

PATENT NO. : 5,829,199
DATED : November 3, 1998
INVENTOR(S) : Harvey et al.

Page 1 of 1

It is certified that error appears in the above-identified patent and that said Letters Patent is hereby corrected as shown below:

Item [21],
Application Number, replace number "676/266" and insert -- 08/676,266 --.

Column 8,
Line 54, replace "11" with -- 16 --.

Column 10,
Line 9, replace "20" with -- 18 --.

Signed and Sealed this

Fourth Day of December, 2001

Attest:

NICHOLAS P. GODICI
Attesting Officer     Acting Director of the United States Patent and Trademark Office